(12) United States Patent
Kabayashi et al.

(10) Patent No.: US 9,328,175 B2
(45) Date of Patent: May 3, 2016

(54) SULFUR-MODIFIED CHLOROPRENE RUBBER, MOLDING THEREOF, AND PRODUCTION METHOD THEREFORE

(75) Inventors: Naoki Kabayashi, Itoigawa (JP); Ryochi Suzuki, Itoigawa (JP); Motohiro Ose, Itoigawa (JP); Yasushi Abe, Itoigawa (JP)

(73) Assignee: DENKA COMPANY LIMITED, Tokyo (JP)

( * ) Notice: Subject to any disclaimer, the term of this patent is extended or adjusted under 35 U.S.C. 154(b) by 461 days.

(21) Appl. No.: 13/989,238

(22) PCT Filed: Oct. 25, 2011

(86) PCT No.: PCT/JP2011/074507
§ 371 (c)(1),
(2), (4) Date: May 23, 2013

(87) PCT Pub. No.: WO2012/070347
PCT Pub. Date: May 31, 2012

(65) Prior Publication Data
US 2013/0245202 A1    Sep. 19, 2013

(30) Foreign Application Priority Data
Nov. 26, 2010 (JP) ................. 2010-263150

(51) Int. Cl.
| | |
|---|---|
| C08C 19/20 | (2006.01) |
| F16G 1/06 | (2006.01) |
| F16G 5/04 | (2006.01) |
| C08C 19/08 | (2006.01) |
| C08C 19/22 | (2006.01) |
| C08C 19/26 | (2006.01) |
| C08F 236/18 | (2006.01) |

(52) U.S. Cl.
CPC ................. *C08C 19/20* (2013.01); *C08C 19/08* (2013.01); *C08C 19/22* (2013.01); *C08C 19/26* (2013.01); *C08F 236/18* (2013.01); *F16G 1/06* (2013.01); *F16G 5/04* (2013.01)

(58) Field of Classification Search
CPC ........ C08C 19/08; C08C 19/20; C08C 19/22; C08C 19/26; C08F 236/18; F16G 1/06; F16G 5/04

USPC ............................................. 525/331.3, 352
See application file for complete search history.

(56) References Cited

U.S. PATENT DOCUMENTS

| | | | | |
|---|---|---|---|---|
| 3,507,825 | A | * | 4/1970 | Paris ....................... C08F 36/16 524/169 |
| 4,124,754 | A | * | 11/1978 | Miller ..................... C08F 36/18 526/220 |

FOREIGN PATENT DOCUMENTS

| | | |
|---|---|---|
| CN | 101255243 A | 9/2008 |
| JP | 7-62029 | 3/1995 |
| JP | 9-3120 | 1/1997 |
| JP | 9-268239 | 10/1997 |
| JP | 10-130424 | 5/1998 |
| JP | 11-116622 | 4/1999 |
| JP | 2009-275124 | 11/2009 |
| JP | 2010-121086 | 6/2010 |

OTHER PUBLICATIONS

International Search Report for PCT/JP2011/074507; mailed Feb. 7, 2012.
Extended European Search Report dated Jan. 12, 2015 to European Application No. 11843653.4.
First Chinese Office Action issued Jul. 1, 2014 to Chinese Application No. 201180056086.4.
Second Chinese Office Action issued Jan. 28, 2015 to Chinese Application No. 201180056086.4.

* cited by examiner

*Primary Examiner* — Ling Choi
*Assistant Examiner* — Chun-Cheng Wang
(74) *Attorney, Agent, or Firm* — Stein IP, LLC

(57) ABSTRACT

Provided are a sulfur-modified chloroprene rubber with reduced exothermicity, a molding thereof, and a production method therefor.
A sulfur-modified chloroprene rubber modified at the polymer terminals with at least one compound selected from tetramethylthiuram disulfide, tetraalkylthiuram disulfides with alkyl groups having a carbon number of 2 to 7 and dialkyldithiocarbamic acid salts with alkyl groups having a carbon number of 1 to 7, wherein there are peak tops at 3.55 to 3.61 ppm and at 3.41 to 3.47 ppm in $^1$H-NMR spectrum, as determined in deuterochloroform solvent, wherein the ratio (A/B) of the peak area (A) at 3.55 to 3.61 ppm to the peak area (B) at 4.2 to 6.5 ppm is 0.05/100 to 0.50/100, and the extract with ethanol/toluene azeotropic mixture, as specified by JIS K 6229, is 3.0 to 9.0 mass %.

9 Claims, 1 Drawing Sheet

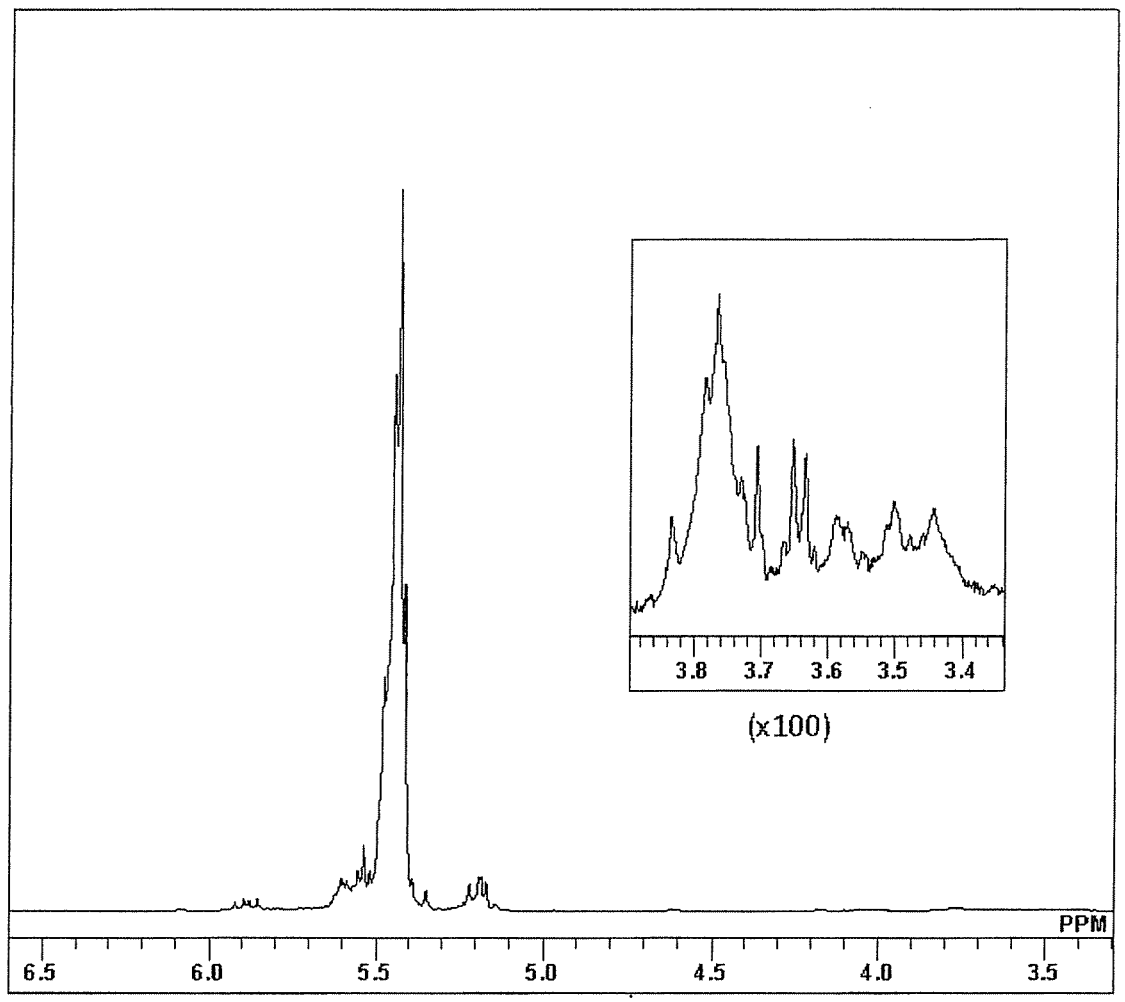

SULFUR-MODIFIED CHLOROPRENE RUBBER, MOLDING THEREOF, AND PRODUCTION METHOD THEREFORE

CROSS-REFERENCE TO RELATED APPLICATIONS

This application is a national stage application of PCT Application No. PCT/JP2011/074507, filed Oct. 25, 2011, which claims the benefit of Japanese Application No. JP2010-263150, filed Nov. 26, 2010, in the Japanese Intellectual Property Office, the disclosures of which are incorporated herein by reference.

BACKGROUND OF THE INVENTION

1. Field of the Invention

The present invention relates to a sulfur-modified chloroprene rubber, a molding thereof, and a production method therefor. Specifically, it relates to a sulfur-modified chloroprene rubber that is used in dynamic environment applications, such as driving belts and conveyer belts generally used in industries and air springs and anti-vibration rubbers for automobiles, and a molding thereof and a production method therefor.

2. Description of the Related Art

Chloroprene rubbers, which are grouped grossly into sulfur-modified chloroprene rubbers and non-sulfur-modified chloroprene rubbers, are used in a variety of fields, for example as auto parts, adhesive agents, various industrial components and others, using the properties of respective rubbers.

Sulfur-modified chloroprene rubbers with their superior dynamic properties have been used in various dynamic environment applications, for example as driving belts and conveyer belts used generally in industries, air springs and anti-vibration rubbers for automobiles and others. Because these products deform and return to their original shape repeatedly under dynamic stress, these rubbers themselves generate heat, causing a problem of degradation thereof and reduction of product lifetime. Thus, there exists an urgent need for development of a sulfur-modified chloroprene rubber with reduced exothermicity.

As an example of the method of reducing the exothermicity of rubbers, known is a low-exothermicity rubber composition comprising an elastomer crosslinkable with an organic peroxide-based crosslinking agent such as acrylonitrile-butadiene copolymer rubber, a metal salt of α,β-ethylenic unsaturated carboxylic acid, magnesium oxide having a BET specific surface area of 25 m²/g or less, and an organic peroxide-based crosslinking agent (see Patent Document 1). Also known is a rubber composition containing a particular low-exothermicity carbon black (see Patent Document 2). Also known is a modified conjugated diene-based polymer obtained by mixing a high-molecular weight component (A) having particular properties and a low-molecular weight component (B) having particular properties (see Patent Document 3).

CITATION LIST

[Patent Document 1] Japanese Unexamined Patent Application Publication No. 9-268239

[Patent Document 2] Japanese Unexamined Patent Application Publication No. 10-130424

[Patent Document 3] Japanese Unexamined Patent Application Publication No. 2010-121086

SUMMARY OF THE INVENTION

However, in the conventional technologies described in Patent Documents 1 to 3, the exothermicity of sulfur-modified chloroprene rubbers is reduced by indirect means for example with a special compounding agent or a third component, resulting in problems that it was thus difficult to achieve sufficient reduction of exothermicity and that there were restrictions in the blending additives and applications.

Thus, the object of the present invention is to provide a sulfur-modified chloroprene rubber with reduced exothermicity, a molding thereof, and a production method therefor.

The sulfur-modified chloroprene rubber according to the present invention is modified at the polymer terminals with at least one compound selected from tetramethylthiuram disulfide, tetraalkylthiuram disulfides represented by the following Chemical Formula 1 and dialkyldithiocarbamic acid salts represented by the following Chemical Formula 2, wherein: there are peak tops at 3.55 to 3.61 ppm and 3.41 to 3.47 ppm in $^1$H-NMR spectrum, as determined in deuterochloroform solvent, wherein the ratio (A/B) of the peak area (A) of 3.55 to 3.61 ppm to the peak area (B) of 4.2 to 6.5 ppm is 0.05/100 to 0.50/100; and the extract with ethanol/toluene azeotropic mixture (liquid mixture of 70 vol % ethanol and 30 vol % toluene, hereinafter referred to as ETA), as specified in JIS K 6229, is 3.0 to 9.0 mass %. JIS is the abbreviation for Japanese Industrial Standards. In the following Chemical Formula 1, $R_1$, $R_2$, $R_3$ and $R_4$ each represent an alkyl group having a carbon number of 2 to 7, while in the following Chemical Formula 2, $R_5$ and $R_6$ each represent an alkyl group having a carbon number of 1 to 7 and M represents a metal element.

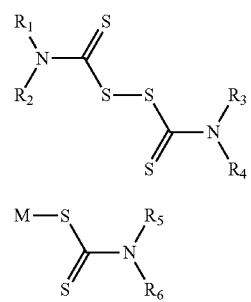

[C. 1]

[C. 2]

Alternatively, the content of rosin acids, as determined by placing the cut sulfur-modified chloroprene rubber in an eggplant-shaped flask equipped with a condenser, extracting rosin acids with ETA and measuring the peak area of the rosin components by gas chromatography, may be 2.0 to 7.0 mass %, and the content of fatty acids, as determined by placing the cut sulfur-modified chloroprene rubber in an eggplant-shaped flask equipped with a condenser, extracting fatty acids with ETA and measuring the peak area of the fatty acid components by gas chromatography, may be 0.01 to 0.3 mass %. The rosin acids above mean rosin acids, disproportionated rosin acids, disproportionated rosin acid alkali metal salts, or the compounds thereof.

The molding of the present invention is a molded article prepared from the sulfur-modified chloroprene rubber. Examples of the moldings include driving belts, conveyer belts, antivibration rubbers, air springs and the like.

The method for producing a sulfur-modified chloroprene rubber according to the present invention is a method of producing a sulfur-modified chloroprene rubber having peak tops at 3.55 to 3.61 ppm and 3.41 to 3.47 ppm in $^1$H-NMR spectrum, as determined in deuterochloroform solvent, wherein the ratio (A/B) of the peak area (A) of 3.55 to 3.61 ppm to the peak area (B) of 4.2 to 6.5 ppm is 0.05/100 to 0.50/100 and having an ETA extract, as specified in JIS K 6229, of 3.0 to 9.0 mass %, the method comprising a polymerization step of obtaining a polymer by emulsion polymerization of a mixture of at least sulfur and chloroprene, and a plasticizing step of modifying the terminals of the polymer with at least one compound selected from tetramethylthiuram disulfide, tetrathiuram disulfides represented by Chemical Formula 1 above and dialkyldithiocarbamic acid salts represented by Chemical Formula 2 above.

It is possible according to the present invention to reduce the exothermicity of a sulfur-modified chloroprene rubber and the molding thereof, because the terminals of the polymer are modified with a plasticizer comprising at least one compound selected from tetramethylthiuram disulfide, tetrathiuram disulfides and dialkyldithiocarbamic acid salts and the ETA extract and the peak area ratio (A/B) thereof are controlled in suitable ranges.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 1 is the $^1$H-NMR spectrum of the sulfur-modified chloroprene rubber in Example 1 of the present invention.

DETAILED DESCRIPTION OF THE EMBODIMENTS

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Hereinafter, favorable embodiments of the present invention will be described in detail. However, it should be understood that the present invention is not restricted by the embodiments described below.

First Embodiment

<Sulfur-Modified Chloroprene Rubber>
First, the sulfur-modified chloroprene rubber in the first embodiment of the present invention will be described.

The sulfur-modified chloroprene rubber in the first embodiment is obtained by producing a polymer by emulsion polymerization of a mixture of sulfur, 2-chloro-1,3-butadiene (hereinafter, referred to as chloroprene) and, as needed, other one or more monomers and modifying the terminals of the polymer with a plasticizer comprising at least one compound selected from tetramethylthiuram disulfide, tetraalkylthiuram disulfides represented by the following Chemical Formula 3 and dialkyldithiocarbamic acid salts represented by the following Chemical Formula 4. In the following Chemical Formula 3, $R_1$, $R_2$, $R_3$ and $R_4$ each represent an alkyl group having a carbon number of 2 to 7. Alternatively in the following Chemical Formula 4, $R_5$ and $R_6$ each represent an alkyl group having a carbon number of 1 to 7 and M represents a metal element.

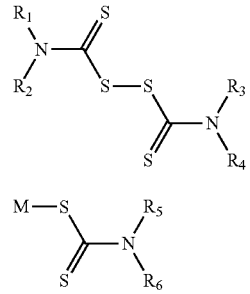

[C. 3]

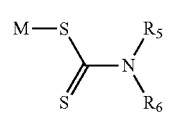

[C. 4]

[Polymer]
The polymer in the first embodiment is obtained, as described above, by emulsion polymerization of a mixture of sulfur, chloroprene and, as needed, other one or more monomers.

Examples of the other monomers copolymerizable with chloroprene include 2,3-dichloro-1,3-butadiene, 1-chloro-1,3-butadiene, styrene, acrylonitrile, methacrylonitrile, isoprene, butadiene, methacrylic acid, and the esters thereof, and the like.

When used, the amount of the other monomers used is in the range that does not impair the properties of the sulfur-modified chloroprene rubber obtained, preferably 10 mass % or less with respect to the total amount of sulfur, chloroprene, and other monomers. Use of the other monomers in an amount of more than 10 mass % may lead to drastic increase of the exothermicity and deterioration of the tensile strength and the like of the sulfur-modified chloroprene rubber obtained.

[NMR Spectrum]
The sulfur-modified chloroprene rubber in the first embodiment has peak tops at 3.55 to 3.61 ppm and at 3.41 to 3.47 ppm in $^1$H-NMR spectrum, as determined in deuterochloroform solvent, wherein the ratio (A/B) of the peak area (A) at 3.55 to 3.61 ppm to the peak area (B) at 4.2 to 6.5 ppm is in the range of 0.05/100 to 0.50/100.

The peaks at 3.41 to 3.47 ppm and at 3.55 to 3.61 ppm derive from the methyl groups in —N(CH$_3$)$_2$ at the dimethylthiuram terminals formed when the tetramethylthiuram disulfide binds to the terminals of the chloroprene chain. Observation of two peaks is because rotation around the C—N bond of CS—N(CH$_3$)$_2$ is restricted, forming geometrical isomers.

In other words, the presence of two peak tops at 3.41 to 3.47 ppm and at 3.55 to 3.61 ppm indicates that there are tetramethylthiuram disulfide-derived dimethylthiuram sulfides bound to the terminals of the chloroprene chain in the sulfur-modified chloroprene rubber.

The peaks at 4.2 to 6.5 ppm derive from the —CH— groups mainly in the chloroprene main structure in the chloroprene rubber, such as trans-1,4-bonds. Thus, the ratio (A/B) of the peak area (A) at 3.55 to 3.61 ppm to the peak area (B) at 4.2 to 6.5 ppm shows the relative amount of the tetramethylthiuram disulfide-derived dimethylthiuram sulfide bound to the terminals of the sulfur-modified chloroprene rubber to the polymer.

When the ratio (A/B) of the peak area (A) at 3.55 to 3.61 ppm to the peak area (B) at 4.2 to 6.5 ppm of the sulfur-modified chloroprene rubber is in the range of 0.05/100 to 0.50/100, it is possible to reduce the exothermicity of the sulfur-modified chloroprene rubber obtained. When (A/B) is less than 0.05/100, it is not possible to obtain the effect to reduce the exothermicity of the sulfur-modified chloroprene rubber obtained, while a (A/B) ratio of more than 0.50/100 leads to rapid increase of the exothermicity of the sulfur-modified chloroprene rubber obtained.

The $^1$H-NMR spectrum can be obtained in the following manner: The sulfur-modified chloroprene rubber obtained is purified with benzene and methanol and further freeze-dried, to give a sample. It is dissolved in deuterochloroform before measurement. The measurement data is corrected with reference to the peak of the chloroform contained in the deuterochloroform used as the solvent (7.24 ppm).

[ETA Extract]

The ETA extract, as specified in JIS K 6229, of the sulfur-modified chloroprene rubber in the first embodiment is in the range of 3.0 to 9.0 mass %. An ETA extract of less than 3.0 mass % leads to decrease of the scorch time of the sulfur-modified chloroprene rubber obtained and consequently to decrease of storage stability. An ETA extract of more than 9.0 mass % leads to drastic increase of the exothermicity of the sulfur-modified chloroprene rubber obtained.

The ETA extract (mass %) can be calculated from the mass ratio of the ETA extract, which is determined by placing the cut sulfur-modified chloroprene rubber in an eggplant-shaped flask equipped with a condenser and extracting it with ETA, to the mass of the sulfur-modified chloroprene rubber before extraction. Specifically, the mass of the sulfur-modified chloroprene rubber before ETA extraction (C) and the mass of the solid matter obtained after the ETA extract solution is dried (D) are determined, and the ETA extract is calculated by the formula: (D/C) 100.

The components contained in the ETA extract include, for example, rosin acids, fatty acids, free sulfur, free plasticizers and the like. The ETA extract can be controlled, as the addition amount of the compounds added during emulsion polymerization, the polymerization rate, the plasticization temperature or the plasticization period of the sulfur-modified chloroprene rubber is modified.

[Rosin Acid Content]

The content of the rosin acids in the sulfur-modified chloroprene rubber in the present embodiment is preferably 2.0 to 7.0 mass %. A rosin acid content of less than 2.0 mass % may lead to deterioration of the thermal stability and thus storage stability of the sulfur-modified chloroprene rubber, while a rosin acid content of more than 7.0 mass % may prohibit the effect of reducing the exothermicity of the sulfur-modified chloroprene rubber.

The "content of rosin acids in the sulfur-modified chloroprene rubber" can be determined by placing the cut sulfur-modified chloroprene rubber in an eggplant-shaped flask equipped with a condenser, extracting rosin acids from the rubber with ETA and measuring the components by gas chromatography and by calculation from the peak area of the rosin component. The content of rosin acids in the sulfur-modified chloroprene rubber can be adjusted by modification of the addition amount of the rosin acids added as emulsifier and the polymerization rate, as will be described below.

[Fatty Acid Content]

Fatty acids are contained previously as a component constituting the rosin emulsion or added separately as emulsifier during emulsion polymerization. The content of the fatty acids in the sulfur-modified chloroprene rubber of the present embodiment is preferably 0.01 to 0.3 mass %. It is thus possible to improve the effect of reducing exothermicity.

The fatty acids are saturated or unsaturated fatty acids having a carbon number of 6 to 22 or the alkali-metal salts thereof. Natural fatty acids such as palmitic acid, stearic acid, oleic acid, linoleic acid, linolenic acid, γ-linolenic acid, arachidonic acid, EPA (eicosapentaenoic acid) and DHA (docosahexaenoic acid) are used favorably, but fatty acids having a similar carbon number and those having the same carbon number but having a different number of unsaturated bonds or having unsaturated bonds at different sites may also be used. Particularly in practice, stearic acid and oleic acid are favorable.

The "content of fatty acids in the sulfur-modified chloroprene rubber" can be determined by placing the cut sulfur-modified chloroprene rubber in an eggplant-shaped flask equipped with a condenser, extracting fatty acids with ETA and determining the fatty acids by gas chromatography and by calculation from the peak area of the fat acid component.

<Method of Producing Sulfur-Modified Chloroprene Rubber>

Hereinafter, the method of producing the sulfur-modified chloroprene rubber in the first embodiment of the present invention will be described.

[Polymerization Step]

First in the polymerization step a polymer is produced by emulsion polymerization of a mixture of sulfur, chloroprene and, as needed, other one or more monomers.

The amount of the sulfur used during the emulsion polymerization is preferably 0.1 to 1.5 mass %, more preferably 0.3 to 1.5 mass %, with respect to the total amount of sulfur, chloroprene and the other monomers. A sulfur content of less than 0.1 mass % may prohibit the favorable mechanical and dynamic properties characteristic of the sulfur-modified chloroprene rubber and also lead to drastic decrease of the plasticization rate in the plasticization step described below and thus to deterioration of productivity. Alternatively, a sulfur content of more than 1.5 mass % may lead to drastic decrease in Mooney viscosity of the blend during processing and thus to reduction of processability.

The emulsifiers for use in the emulsion polymerization are preferably rosin acids, and other emulsifiers commonly used or the fatty acids described below may be used in combination. Examples of the other emulsifiers include metal salts of aromatic sulfonic acid formalin condensates, sodium dodecylbenzenesulfonate, potassium dodecylbenzenesulfonate, sodium alkyldiphenylethersulfonates, potassium alkyldiphenylethersulfonates, sodium polyoxyethylene-alkylethersulfonates, sodium polyoxypropylene-alkylethersulfonate, potassium polyoxyethylene-alkylethersulfonates, potassium polyoxypropylene-alkylethersulfonates and the like.

An emulsifier used particularly favorably is an aqueous alkali soap solution containing a mixture of alkali-metal salts of disproportionated rosin acids and saturated or unsaturated fatty acids having 6 to 22 carbons. The components constituting the disproportionated rosin acids include, for example, sesquiterpene, 8,5-isopimaric acid, dehydropimaric acid, seco-dehydroabietic acid, dihydroabietic acid, deisopropyl-dehydroabietic acid, demethyl-dehydroabietic acid and the like.

The pH of the aqueous emulsion when the emulsion polymerization is started is desirably 10.5 to 13.0. The aqueous emulsion above is the liquid mixture of sulfur, chloroprene, other monomers copolymerizable with chloroprene, emulsifiers and others immediately before the emulsion polymerization is started, but the composition may vary, if some components are added afterward or added in portions. If the pH of the aqueous emulsion is less than 10.5 when the emulsion polymerization is started and if rosin acids are used as the emulsifier, it may not be possible to control the polymerization reliably, for example because of polymer precipitation during polymerization. Alternatively if the pH is more than 13.0, the sulfur-modified chloroprene rubber obtained may have unfavorably low exothermicity. The pH of the aqueous emulsion can be adjusted appropriately by modification of the amount of the alkali component, such as sodium hydroxide or potassium hydroxide, present during emulsion polymerization.

The polymerization temperature during the emulsion polymerization is 0 to 55° C., preferably 30 to 55° C., from the viewpoints of polymerization regulation and productivity.

A polymerization initiator commonly used in radical polymerization, such as potassium persulfate, benzoyl peroxide, ammonium persulfate or hydrogen peroxide, is used as the polymerization initiator.

The polymerization is carried out to a conversion rate for example in the range of 30 to 95%, preferably in the range of 50 to 95%, and terminated by addition of a polymerization inhibitor. A conversion rate of less than 30% leads to exceptionally low copolymerization rate with sulfur, thus prohibiting practical mechanical properties. Alternatively, a conversion rate of more than 95% may lead to deterioration of the processability of the sulfur-modified chloroprene rubber obtained by development of branched structure and by gel formation.

The polymerization inhibitor is, for example, thiodiphenylamine, 4-tert-butylcatechol, 2,2'-methylene-bis-4-methyl-6-tert-butylphenol or the like. Unreacted monomers after the emulsification polymerization can be removed by a common method such as distillation under reduced pressure or the like.

[Plasticization Step]

The polymer obtained by the emulsion polymerization is treated with a plasticizer containing at least one compound selected from tetramethylthiuram disulfide, tetraalkylthiuram disulfides with an alkyl group having a carbon number of 2 to 7 shown in Chemical Formula 3 above, and dialkyldithiocarbamic acid salts with an alkyl group having a carbon number of 1 to 7 shown in Chemical Formula 4 above for cleavage of the terminal chains, depolymerization and reduction of the length of the polymer chain to a degree suitable for molding processing and to make the Mooney viscosity thereof fall in a suitable range.

The plasticization with a plasticizer containing at least one compound selected from tetramethylthiuram disulfide, tetraalkylthiuram disulfides represented by Chemical Formula 3 and dialkyldithiocarbamic acid salts represented by Chemical Formula 4 is carried out at a temperature of 20 to 70° C., until the sulfur-modified chloroprene rubber obtained has a Mooney viscosity in the following range.

The range of the Mooney viscosity ($ML_{1+4}$, 100° C.) of the sulfur-modified chloroprene rubber in the present embodiment is preferably 20 to 120, more preferably 25 to 90, still more preferably 30 to 60, from the viewpoint of practical processability. The term "$ML_{1+4}$" means that the type-L roller used in Mooney viscosity measurement is preheated for 1 minute and that the rotation time is 4 minutes, and the term "100° C." means the test temperature. The Mooney viscosity can be determined according to JIS K 6300-1.

<Plasticizer>

As described above, the plasticizer used in the plasticization step contains at least one compound selected from tetramethylthiuram disulfide, tetraalkylthiuram disulfides represented by Chemical Formula 3 and dialkyldithiocarbamic acid salts represented by Chemical Formula 4.

The tetraalkylthiuram disulfides represented by Chemical Formula 3 are, for example, tetraethylthiuram disulfide, tetraisopropylthiuram disulfide, tetra-n-propylthiuram disulfide, tetra-n-butylthiuram disulfide and tetra-n-hexylthiuram disulfide. The dialkyldithiocarbamic acid salts represented by Chemical Formula 4 include sodium dimethyldithiocarbamate, sodium diethyldithiocarbamate, sodium dibutyldithiocarbamate and the like. In particular, tetraethylthiuram disulfide, which is a compound of Chemical Formula 3 wherein four alkyl groups ($R_1$, $R_2$, $R_3$, $R_4$) are all ethyl groups, is used favorably from the viewpoint of the efficiency of plasticization regulation.

As described above, the at least one compound selected from tetraalkylthiuram disulfides represented by Chemical Formula 3 and dialkyldithiocarbamic acid salts represented by Chemical Formula 4 is added to make the ETA extract fall in the range of 3.0 to 9.0 mass % and the (A/B) ratio fall in the range of 0.05/100 to 0.50/100.

The plasticizer described above may be added to the aqueous emulsion after emulsion polymerization and before removal of unreacted monomers or to the aqueous emulsion after removal of unreacted monomers. Depending on the amount of the plasticizer added, the plasticizer may be added both in combination before and after removal of unreacted monomers. Because most of the tetraalkylthiuram disulfides represented by Chemical Formula 3 and the dialkyldithiocarbamic acid salts represented by Chemical Formula 4 are solid (powder) at room temperature, they are preferably added to the sulfur-modified chloroprene rubber, as they are dispersed in an aqueous emulsion.

Specifically, alkali-metal salts of saturated or unsaturated fatty acids for example having a carbon number of 6 to 22 and/or alkali-metal salts of β-naphthalenesulfonic acid formalin condensates are made available, and these emulsifiers are added to a small amount of water, to give an emulsion. Then, a tetraalkylthiuram disulfide represented by Chemical Formula 3 and an dialkyldithiocarbamic acid salt represented by Chemical Formula 4 are added to the emulsion, and the resulting solution is mixed and agitated for example with an agitating blade or a stirrer, to give a plasticizer dispersion, which is then used for plasticization. It is possible in this way to make the plasticizers described above show their properties effectively.

<Chain-Transfer Agent>

A known chain-transfer agent may be added with the plasticizer in the plasticization step. The known chain-transfer agent is, for example, xanthate salts such as potassium ethylxanthate and sodium 2,2-(2,4-dioxopentamethylene)-n-butyl-xanthate and the like.

<Stabilizer>

For prevention of the change of Mooney viscosity during storage, a small amount of stabilizer may be added to the sulfur-modified chloroprene rubber obtained in the plasticization step, to give a sulfur-modified chloroprene rubber composition. Examples of such stabilizers include phenyl-α-naphthylamine, octylated diphenylamine, 2,6-di-tert-butyl-4-phenylphenol, 2,2'-methylene-bis(4-methyl-6-tert-butylphenol), 4,4'-thio-bis-(6-tert-butyl-3-methylphenol) and the like. 4,4'-Thio-bis-(6-terty-butyl-3-methylphenol) is preferable.

Because the sulfur-modified chloroprene rubber in the present embodiment is structurally modified with a plasticizer in a particular structure and the ratio (A/B) of ETA extract to peak area is adjusted in a particular range, the sulfur-modified chloroprene rubber show low exothermicity. In addition, because it contains particular amounts rosin acids and fatty acids, it is possible to reduce the exothermicity of the sulfur-modified chloroprene rubber more reliably.

Second Embodiment

Hereinafter, the molding in the second embodiment of the present invention will be described. The molding in the present embodiment is prepared by molding the aforementioned sulfur-modified chloroprene rubber in the first embodiment and can be used favorably as a molding that deforms under repeated load of dynamic kinetic stimuli, such as driving belt, conveyer belt, antivibration rubber or air spring.

The molding method for production of the molding in the present embodiment is, for example, extrusion molding, injection molding, compression molding, calendering molding or the like, but is not limited to thereto.

Because the molding of the present embodiment is prepared from the above-mentioned sulfur-modified chloroprene rubber with reduced exothermicity, the rubber itself is resistant to degradation caused by heat generation or to reduction of product lifetime, even if it deforms repeatedly, as it is exposed to dynamic kinetic stimuli.

EXAMPLES

Hereinafter, the present invention will be described more in detail with reference to Examples and Comparative Examples, but it should be understood that the present invention is not limited to these Examples. Unless specified otherwise, the "part by mass," as used in the specification, is the amount with respect to chloroprene monomer and the mass % is the amount with respect to the chloroprene rubber.

Example 1

<Preparation of Sulfur-Modified Chloroprene Rubber>

(a) Added into a polymerization tank having an internal capacity of 30 liter were 100 parts by mass of chloroprene monomer, 0.55 part by mass of sulfur, 105 parts by mass of purified water, 3.80 parts by mass of potassium salt of disproportionated rosin acids (produced by Harima Chemicals Group, Inc.), 0.05 part by mass of oleic acid, 0.55 part by mass of sodium hydroxide, and 0.5 part by mass of sodium salt of β-naphthalenesulfonic acid formalin condensate (trade name: DEMOL N, manufactured by Kao Corp.). The pH of the aqueous emulsifier before start of polymerization was 12.8. 0.1 Part by mass of potassium persulfate was added thereto as polymerization initiator and the mixture was polymerized at a polymerization temperature of 40° C. under nitrogen stream. A polymerization terminator diethylhydroxyamine was added at the time of a conversion rate of 75% for termination of polymerization, to give a latex.

(b) The latex obtained in step (a) above was distilled under reduced pressure for removal of unreacted monomers, to give a post-polymerization latex before plasticization (hereinafter, the latex after polymerization will be referred to as "latex").

(c) Subsequently, added to the latex was a plasticizer emulsion containing: 3.0 parts by mass of chloroprene monomer as solvent; 0.3 part by mass of tetramethylthiuram disulfide (trade name: NOCCELER TT; produced by Ouchi Shinko Chemical Industrial Co., Ltd.) and 2.0 parts by mass of tetraethylthiuram disulfide (trade name: NOCCELER TET; produced by Ouchi Shinko Chemical Industrial Co., Ltd.) as plasticizers; 0.05 part by mass of sodium salt of β-naphthalenesulfonic acid formalin condensate as dispersant; and 0.05 part by mass of sodium laurylsulfate as emulsifier, and the mixture was kept under agitation at a temperature of 50° C. for 1 hour for plasticization.

The sodium salt of β-naphthalenesulfonic acid formalin condensate used, which is a dispersant commonly used, improves the stability of the latex and permits production thereof without aggregation or precipitation in the production process, even when added in a small amount. A plasticizer was also added to the latex after emulsion polymerization in this example, but then, an emulsion of sodium laurylsulfate in a plasticizer solution, which was prepared by dissolving the plasticizer in chloroprene added as solvent, was added for further stabilized plasticization.

(d) The latex was then cooled, and the polymer was isolated by a common freeze-solidification method, to give a sulfur-modified chloroprene rubber.

<Measurement of Nuclear Magnetic Resonance ($^1$H-NMR) Analysis Spectrum>

The sulfur-modified chloroprene rubber was purified with benzene and methanol and freeze-dried. The purified product was dissolved in 5% deuterochloroform solution and the NMR spectrum thereof was measured in JNM-ECX-400 (400 MHz, FT type) manufactured by JOEL Ltd. In the $^1$H-NMR spectrum, there were observed two peak tops at the sites of 3.55 to 3.61 ppm and of 3.41 to 3.47 ppm from that of the standard peak (7.24 ppm) of chloroform in deuterochloroform and the peak area (A) in the range of 3.55 to 3.61 ppm was determined. The area (A) was 0.13 with respect to 100 of the peak area (B) at 4.2 to 6.5 ppm (i.e., the area ratio (A/B) was 0.13/100). The $^1$H-NMR spectrum of the sulfur-modified chloroprene rubber obtained is shown in FIG. 1.

<Measurement Condition of Nuclear Magnetic Resonance ($^1$H-NMR) Analysis>

The nuclear magnetic resonance ($^1$H-NMR) analysis was conducted under the following measurement condition:
Measurement mode: non-decoupling
Flip angle: 45°
Waiting time: 7.0 seconds
Sample rotation frequency: 0 to 12 Hz
Window treatment: exponential function
Integration number: 512

<Determination of ETA Extract and Rosin Acid and Fatty Acid Contents>

Six g of the sulfur-modified chloroprene rubber obtained was cut into pieces of 2 mm square, placed in an eggplant-shaped flask equipped with a condenser. The rosin acids and the fatty acids therein were extracted with ETA and the amounts thereof were determined by gas chromatography. The peak area of the rosin components gave a rosin acid content of 4.4 mass %, while the peak area of the fat acid components gave a fatty acid content of 0.07 mass %. The ETA extract (mass %) was calculated to be 7.1 mass % from the mass ratio of the ETA extract to the sulfur-modified chloroprene rubber.

<Measurement Condition of Gas Chromatography>

The gas chromatography was conducted under the following measurement condition:
Column used: FFAP 0.32 mmϕ 25 m (film thickness: 0.3 μm)
Column temperature: from 200° C. to 250° C.
Heating rate: 10° C./min
Injector temperature: 270° C.
Detector temperature: 270° C.
Injection amount: 2 μl <Mooney Viscosity>

The test was conducted according to the method specified by JIS K 6300-1 under the condition of a type-L-rotor-preheating time of 1 minute, a rotation time of 4 minutes and a test temperature of 100° C.

<Preparation of Test Sample>

One part by mass of stearic acid, 2 parts by mass of octylated diphenylamine, 4 parts by mass of magnesium oxide, 40 parts by mass of carbon black (GPF) and 5.0 parts by mass of zinc oxide were mixed with 100 parts by mass of a sulfur-modified chloroprene rubber, using an 8-inch roll, and the mixture was crosslinked under pressure at 160° C. for 20 minutes, to give a sample for evaluation. The sample was subjected to the following evaluation tests:

[Evaluation of Exothermicity]

The exothermicity of the sulfur-modified chloroprene rubbers of Examples and Comparative Examples was evaluated according to a dynamic viscoelasticity test (JIS K 6394) using Goodrich Flexometer (JIS K 6265). The Goodrich Flexometer method is a test method of determining the fatigue characteristics of a test piece, such as of vulcanized rubber, caused by the heat generated therein when repeated dynamic load is applied on the test piece. Specifically, it is a method of determining the change of the temperature and the creep of the test piece over time, when a static initial load is applied to the test piece under a certain temperature condition and a sinusoidal vibration at a particular amplitude is applied thereon additionally. The test was conducted according to JIS K 6265, and the heat generated (ΔT) was determined under the condition of 50° C., a deformation of 0.175 inch, a load of 55 pounds, and a frequency per minute of 1,800.

[Dynamic Viscoelasticity Test]

In the dynamic viscoelasticity test (JIS K 6394) of a vulcanized rubber, complex elastic modulus E* is defined by the following Mathematical Formula 1. In the following Mathematical Formula 1, the real number part E' of the complex elastic modulus E* represents storage elastic modulus, while the imaginary number part E" represents loss elastic modulus.

$$E^* = E' + iE''$$ [Formula 1]

The phase angle δ, which indicates the temporal delay between deformation and stress, is called loss angle, and the loss tangent tan δ, tangent of the loss angle, is defined by the following Mathematical Formula 2:

$$\tan \delta = E''/E'$$ [Formula 2]

The tan δ, which is a damping term, can be expressed by the ratio of the energy released as heat to the energy stored and is thus an indicator of the easiness of dissipation as heat of the mechanical energy applied to the sulfur-modified chloroprene rubber or the difficulty of the energy to be stored. When the value is low, the rubber is considered to be a low-exothermicity rubber.

The test was conducted according to JIS K 6394 under the following condition:

Analyzer: Rheovibron automatic dynamic viscoelasticity analyzer

Vibration method: displacement amplitude: 10 μm (deformation: 0.05%), static tension: 5 gf Sample shape: plate (width: 0.45 cm, length: 3 cm (interchuck distance: 2 cm), thickness: 0.2 cm Measurement frequency: 10 Hz Measurement temperature condition: −100° C. to 155° C. (heating rate: 2° C./min)

The value at 100° C. was used as tan δ, i.e., as the indicator of exothermicity.

The tan δ was determined at a temperature of 100° C. and a frequency of 10 Hz, as the general dynamic environment (e.g., for driving belts) was taken into consideration.

[Scorch Time]

The scorch time t5 was determined at 125° C. according to JIS K-6300.

[Abrasion Resistance]

The abrasion resistance was determined according to the DIN abrasion test of JIS K-6264-2.

Examples 2 to 13 and Comparative Examples 1 to 8

Test pieces were prepared and evaluated in a manner similar to Example 1, respectively by using the blends shown in the following Tables 1 to 3.

TABLE 1

| | | Example | | | | | | |
|---|---|---|---|---|---|---|---|---|
| | | 1 | 2 | 3 | 4 | 5 | 6 | 7 |
| | Chloroprene | 100 | 100 | 100 | 100 | 100 | 100 | 100 |
| | 2,3-Dichloro-1,3-butadiene | | | | | | | |
| | Sulfur | 0.55 | 0.55 | 0.55 | 0.55 | 0.55 | 0.55 | 0.55 |
| | Purified water | 105 | 105 | 105 | 105 | 105 | 105 | 105 |
| | Potassium salt of disproportionated rosin acids | 3.80 | 3.80 | 3.80 | 3.80 | 3.80 | 3.80 | 3.80 |
| | Oleic acid | 0.05 | 0.05 | 0.05 | 0.05 | 0.05 | 0.05 | 0.05 |
| | Sodium hydroxide | 0.55 | 0.55 | 0.55 | 0.55 | 0.55 | 0.55 | 0.55 |
| | Sodium salt of β-naphthalenesulfonic acid formalin condensate | 0.5 | 0.5 | 0.5 | 0.5 | 0.5 | 0.5 | 0.5 |
| | Conversion rate | 75 | 77 | 76 | 78 | 74 | 75 | 78 |
| Plasticizer | Chloroprene | 3.0 | 3.0 | 3.0 | 3.0 | 3.0 | 3.0 | 3.0 |
| | Tetramethylthiuram disulfide | 0.3 | 0.5 | 0.5 | 0.3 | 0.3 | 0.3 | 0.3 |
| | Tetraethylthiuram disulfide | 2.0 | 2.0 | 1.8 | | | 1.5 | 1.5 |
| | Tetrabutylthiuram disulfide | | | | 2.0 | | | |
| | Tetrahexylthiuram disulfide | | | | | 2.0 | | |
| | Sodium diethyldithiocarbamate | | | | | | 0.5 | |
| | Sodium dibutyldithiocarbamate | | | | | | | 0.5 |
| | Sodium salt of β-naphthalenesulfonic acid formalin condensate | 0.05 | 0.05 | 0.05 | 0.05 | 0.05 | 0.05 | 0.05 |
| | Sodium lauryl sulfate | 0.05 | 0.05 | 0.05 | 0.05 | 0.05 | 0.05 | 0.05 |

TABLE 1-continued

|  |  | Example | | | | | | |
|---|---|---|---|---|---|---|---|---|
|  |  | 1 | 2 | 3 | 4 | 5 | 6 | 7 |
| $^1$H-NMR | Presence of peak at 3.55 to 3.61 ppm | Yes | Yes | Yes | Yes | Yes | Yes | Yes |
|  | Presence of peak at 3.41 to 3.47 ppm | Yes | Yes | Yes | Yes | Yes | Yes | Yes |
|  | Presence of peak at 4.2 to 6.5 ppm | Yes | Yes | Yes | Yes | Yes | Yes | Yes |
|  | A/B | 0.13/100 | 0.19/100 | 0.20/100 | 0.12/100 | 0.11/100 | 0.12/100 | 0.12/100 |
| ML viscosity of raw rubber ($ML_{1+4}$ at 100° C.) | | 38 | 36 | 41 | 39 | 38 | 38 | 37 |
| ETA extract (mass %) | | 7.1 | 7.3 | 7.0 | 7.5 | 7.7 | 7.3 | 7.5 |
| Rosin acid content (mass %) | | 4.4 | 4.3 | 4.4 | 4.4 | 4.6 | 4.4 | 4.3 |
| Fatty acid content | | 0.07 | 0.07 | 0.08 | 0.07 | 0.08 | 0.07 | 0.08 |
| Evaluation | Exothermicity ΔT (° C.) | 32 | 31 | 30 | 34 | 37 | 34 | 35 |
|  | Dynamic viscoelasticity tan δ (at 100° C.) | 0.040 | 0.041 | 0.038 | 0.043 | 0.045 | 0.042 | 0.043 |
|  | Scorch time t5 (ML1 + 4 at 125° C.) | 21.5 | 22.2 | 21.2 | 25.7 | 28.1 | 20.8 | 22.2 |
|  | Abrasion resistance ΔV (cc) | 115 | 116 | 117 | 113 | 113 | 116 | 119 |

TABLE 2

|  |  | Example | | | | | |
|---|---|---|---|---|---|---|---|
|  |  | 8 | 9 | 10 | 11 | 12 | 13 |
|  | Chloroprene | 90 | 100 | 100 | 100 | 100 | 100 |
|  | 2,3-Dichloro-1,3-butadiene | 4 |  |  |  |  |  |
|  | Sulfur | 0.55 | 0.55 | 0.55 | 0.55 | 0.55 | 0.55 |
|  | Purified water | 105 | 105 | 105 | 105 | 105 | 105 |
|  | Potassium salt of disproportionated rosin acids | 3.80 | 1.10 | 5.70 | 3.80 | 3.80 | 3.80 |
|  | Oleic acid | 0.05 | 0.05 | 0.03 | 0.25 | 0.05 | 0.05 |
|  | Sodium hydroxide | 0.55 | 0.55 | 0.55 | 0.55 | 0.55 | 0.55 |
|  | Sodium salt of β-naphthalenesulfonic acid formalin condensate | 0.5 | 0.5 | 0.5 | 0.5 | 0.5 | 0.5 |
|  | Conversion rate | 76 | 62 | 80 | 79 | 78 | 80 |
| Plasticizer | Chloroprene | 3.0 | 3.0 | 3.0 | 3.0 | 3.0 | 3.0 |
|  | Tetramethylthiuram disulfide | 0.3 | 0.3 | 0.3 | 0.3 | 0.1 | 1.4 |
|  | Tetraethylthiuram disulfide | 2.0 | 2.0 | 1.5 | 2.0 | 2.2 | 1.8 |
|  | Tetrabutylthiuram disulfide |  |  |  |  |  |  |
|  | Tetrahexylthiuram disulfide |  |  |  |  |  |  |
|  | Sodium diethyldithiocarbamate |  |  |  |  |  |  |
|  | Sodium dibutyldithiocarbamate |  |  |  |  |  |  |
|  | Sodium salt of β-naphthalenesulfonic acid formalin condensate | 0.05 | 0.05 | 0.05 | 0.05 | 0.05 | 0.05 |
|  | Sodium lauryl sulfate | 0.05 | 0.05 | 0.05 | 0.05 | 0.05 | 0.05 |
| $^1$H-NMR | Presence of peak at 3.55 to 3.61 ppm | Yes | Yes | Yes | Yes | Yes | Yes |
|  | Presence of peak at 3.41 to 3.47 ppm | Yes | Yes | Yes | Yes | Yes | Yes |
|  | Presence of peak at 4.2 to 6.5 ppm | Yes | Yes | Yes | Yes | Yes | Yes |
|  | A/B | 0.11/100 | 0.08/100 | 0.13/100 | 0.13/100 | 0.06/100 | 0.48/100 |
| ML viscosity of raw rubber ($ML_{1+4}$ at 100° C.) | | 38 | 53 | 42 | 40 | 39 | 32 |
| ETA extract (mass %) | | 7.3 | 3.6 | 8.9 | 7.7 | 7.2 | 8.0 |
| Rosin acid content (mass %) | | 4.5 | 1.9 | 7.1 | 4.3 | 4.3 | 4.3 |
| Fatty acid content | | 0.07 | 0.05 | 0.05 | 0.31 | 0.07 | 0.07 |
| Evaluation | Exothermicity ΔT (° C.) | 35 | 35 | 39 | 36 | 38 | 39 |
|  | Dynamic viscoelasticity tan δ (at 100° C.) | 0.045 | 0.043 | 0.049 | 0.045 | 0.049 | 0.049 |
|  | Scorch time t5 (ML1 + 4 at 125° C.) | 21.0 | 8.2 | 18.6 | 23.2 | 22.0 | 29.4 |
|  | Abrasion resistance ΔV (cc) | 114 | 117 | 135 | 115 | 118 | 129 |

TABLE 3

|  |  | Comparative Example | | | | | | | |
|---|---|---|---|---|---|---|---|---|---|
|  |  | 1 | 2 | 3 | 4 | 5 | 6 | 7 | 8 |
|  | Chloroprene | 100 | 100 | 100 | 100 | 100 | 100 | 100 | 100 |
|  | 2,3-Dichloro-1,3-butadiene |  |  |  |  |  |  |  |  |
|  | Sulfur | 0.55 | 0.55 | 0.55 | 0.55 | 0.55 | 0.55 | 0.55 | 0.55 |
|  | Purified water | 105 | 105 | 105 | 105 | 105 | 105 | 105 | 105 |
|  | Potassium salt of disproportionated rosin acids | 3.80 | 3.80 | 3.80 | 3.80 | 3.80 | 3.80 | 1.10 | 6.10 |
|  | Oleic acid | 0.05 | 0.05 | 0.05 | 0.05 | 0.05 | 0.05 | 0.03 | 0.26 |
|  | Sodium hydroxide | 0.55 | 0.55 | 0.55 | 0.55 | 0.55 | 0.55 | 0.55 | 0.55 |
|  | Sodium salt of β-naphthalenesulfonic acid formalin condensate | 0.5 | 0.5 | 0.5 | 0.5 | 0.5 | 0.5 | 0.5 | 0.5 |
|  | Conversion rate | 77 | 78 | 78 | 76 | 79 | 82 | 64 | 80 |

TABLE 3-continued

| | | Comparative Example | | | | | | | |
|---|---|---|---|---|---|---|---|---|---|
| | | 1 | 2 | 3 | 4 | 5 | 6 | 7 | 8 |
| Plasticizer | Chloroprene | 3.0 | 3.0 | 3.0 | 3.0 | 3.0 | 3.0 | 3.0 | 3.0 |
| | Tetramethylthiuram disulfide | | 2.3 | 0.3 | 0.3 | 0.02 | 2.0 | 0.3 | 0.3 |
| | Tetraethylthiuram disulfide | 2.3 | | | | 2.3 | 2.0 | 1.0 | 0.5 |
| | Tetra-n-octylthiuram disulfide | | | 2.0 | | | | | |
| | Sodium di-n-octyldithiocarbamate | | | | 2.0 | | | | |
| | Sodium salt of β-naphthalenesulfonic acid formalin condensate | 0.05 | 0.05 | 0.05 | 0.05 | 0.05 | 0.05 | 0.05 | 0.05 |
| | Sodium lauryl sulfate | 0.05 | 0.05 | 0.05 | 0.05 | 0.05 | 0.05 | 0.05 | 0.05 |
| $^1$H-NMR | Presence of peak at 3.55 to 3.61 ppm | No | Yes | Yes | Yes | Yes | Yes | Yes | Yes |
| | Presence of peak at 3.41 to 3.47 ppm | No | Yes | Yes | Yes | Yes | Yes | Yes | Yes |
| | Presence of peak at 4.2 to 6.5 ppm | Yes | Yes | Yes | Yes | Yes | Yes | Yes | Yes |
| | A/B | 0.00/100 | 0.21/100 | 0.10/100 | 0.09/100 | 0.01/100 | 0.55/100 | 0.12/100 | 0.13/100 |
| | ML viscosity of raw rubber ($ML_{1+4}$ at 100° C.) | 38 | 81 | 42 | 44 | 39 | 25 | 55 | 41 |
| | ETA extract (mass %) | 7.5 | 7.9 | 7.7 | 7.9 | 7.2 | 8.3 | 2.8 | 11.1 |
| | Rosin acid content (mass %) | 4.4 | 4.3 | 4.3 | 4.3 | 4.3 | 4.2 | 1.8 | 7.2 |
| | Fatty acid content | 0.08 | 0.07 | 0.07 | 0.08 | 0.08 | 0.07 | 0.06 | 0.32 |
| Evaluation | Exothermicity ΔT (° C.) | 42 | 56 | 47 | 46 | 42 | 50 | 49 | 49 |
| | Dynamic viscoelasticity tan δ (at 100° C.) | 0.052 | 0.072 | 0.060 | 0.060 | 0.051 | 0.067 | 0.063 | 0.064 |
| | Scorch time t5 (ML1 + 4 at 125° C.) | 22.1 | 5.3 | 28.6 | 26.6 | 22.5 | 31.6 | 7.8 | 21.0 |
| | Abrasion resistance ΔV (cc) | 118 | 117 | 122 | 120 | 119 | 139 | 119 | 138 |

As obvious from Tables 1 to 3, the sulfur-modified chloroprene rubbers according to the present invention of Examples 1 to 13 are not inferior in scorch time and abrasion resistance and superior in exothermicity and dynamic viscoelasticity tan δ, an indicator of exothermicity, to the sulfur-modified chloroprene rubbers of Comparative Examples 1 to 8.

In contrast in Comparative Example 1, wherein tetramethylthiuram disulfide was not used as the plasticizer, there were no peak top at 3.55 to 3.61 ppm or at 3.41 to 3.47 ppm in $^1$H-NMR spectrum and the sulfur-modified chloroprene rubber was inferior in exothermicity and dynamic viscoelasticity tan δ to those of Examples 1 to 13. Alternatively in Comparative Example 2, wherein neither tetraalkylthiuram disulfide nor dialkyldithiocarbamic acid was used as the plasticizer, the sulfur-modified chloroprene rubber was inferior in exothermicity and dynamic viscoelasticity tan δ to those of Examples 1 to 13.

In Comparative Example 3, wherein tetraalkylthiuram disulfide with an alkyl group having a carbon number of 8 (tetra-n-octylthiuram disulfide) was used as one of the plasticizers, the sulfur-modified chloroprene rubber was inferior in exothermicity and dynamic viscoelasticity tan δ. Alternatively in Comparative Example 4, wherein dialkyldithiocarbamic acid salt with an alkyl group having a carbon number of 8 (sodium di-n-octyldithiocarbamate) was used as one of the plasticizers, the sulfur-modified chloroprene rubber was inferior in exothermicity and dynamic viscoelasticity tan δ.

In Comparative Example 5, wherein the ratio (A/B) of the peak area (A) at 3.55 to 3.61 ppm to the peak area (B) at 4.2 to 6.5 ppm of the sulfur-modified chloroprene rubber is less than 0.5/100, it was not possible to obtain the effect of reducing the exothermicity of the sulfur-modified chloroprene rubber and the sulfur-modified chloroprene rubber obtained was inferior in exothermicity and dynamic viscoelasticity tan δ. Alternatively in Comparative Example 6, wherein the ratio (A/B) is greater than 0.50/100, the sulfur-modified chloroprene rubber obtained showed rapid increase of the exothermicity and thus was inferior in exothermicity and dynamic viscoelasticity tan δ.

In Comparative Example 7, wherein the ETA extract is less than 3.0 mass %, the sulfur-modified chloroprene rubber obtained had a shorter scorch time. Alternatively in Comparative Example 8, wherein the ETA extract is more than 9.0 mass %, the sulfur-modified chloroprene rubber obtained showed rapid increase of the exothermicity and thus was inferior in exothermicity and dynamic viscoelasticity tan δ.

The sulfur-modified chloroprene rubber of Example 10 was superior in exothermicity and dynamic viscoelasticity tan δ to those of Comparative Examples 1 to 7, but it was higher in exothermicity than those of other Examples, especially of Examples 1 to 9. It is probably due to the high rosin acid content of 7.1 mass %. The fact indicates that the rosin acid content is more preferably 7.0 mass % or less.

Alternatively, the sulfur-modified chloroprene rubber of Example 11 was superior in exothermicity and dynamic viscoelasticity tan δ to those of Comparative Examples 1 to 7, but was higher in exothermicity, when compared with that of Example 1, which was prepared under the mostly similar condition except that the fatty acid content differed, because the amount of oleic acid added was different. It was considered that the effect of reducing exothermicity is smaller in Example 11, as compared to that in Example 1, because the fatty acid content was higher at 0.31 mass %. The fact indicates that the fatty acid content is more preferably 0.3 mass % or less.

Although not shown in each Table, it was not possible to obtain the properties of the sulfur-modified chloroprene rubber of Example 1, with a sulfur-modified chloroprene rubber prepared similarly to Example 1, except that: 0.3 part by mass of tetramethylthiuram disulfide was not added to the plasticizer emulsion; the rubber was isolated by a common freeze-solidification method and kneaded with rolls; and 0.3 part by mass of tetramethylthiuram disulfide was added thereto during kneading. Thus in the present invention, it was essential to add a plasticizer to the latex after polymerization.

Although a few embodiments of the present invention have been shown and described, it would be appreciated by those skilled in the art that changes may be made in this embodiment without departing from the principles and spirit of the invention, the scope of which is defined in the claims and their equivalents.

The invention claimed is:

1. A sulfur-modified chloroprene rubber modified at the polymer terminals with tetramethylthiuram disulfide and at least one compound selected from tetraalkylthiuram disulfides represented by the following Chemical Formula (1) and dialkyldithiocarbamic acid salts represented by the following Chemical Formula (2), wherein:

there are peak tops at 3.55 to 3.61 ppm and at 3.41 to 3.47 ppm in $^1$H-NMR spectrum, as determined in deuterochloroform solvent, wherein the ratio (A/B) of the peak area (A) at 3.55 to 3.61 ppm to the peak area (B) at 4.2 to 6.5 ppm is 0.05/100 to 0.50/100; and the extract with ethanol/toluene azeotropic mixture, as specified by JIS K 6229, is 3.0 to 9.0 mass %,

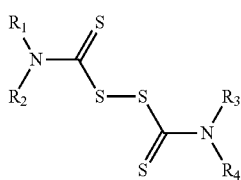

(1)

wherein, $R_1$, $R_2$, $R_3$ and $R_4$ each represent an alkyl group having a carbon number of 2 to 7,

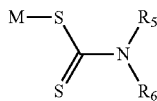

(2)

wherein, $R_5$ and $R_6$ each represent an alkyl group having a carbon number of 1 to 7 and M represents a metal element.

2. The sulfur-modified chloroprene rubber according to claim 1, wherein a rosin acid content of the rubber, as determined by placing the cut sulfur-modified chloroprene rubber in an eggplant-shaped flask equipped with a condenser, extracting the rosin acids therein with ethanol/toluene azeotropic mixture and measuring the amount thereof by gas chromatography, is 2.0 to 7.0 mass %.

3. The sulfur-modified chloroprene rubber according to claim 1, wherein a fatty acid content of the rubber, as determined by placing the cut sulfur-modified chloroprene rubber in an eggplant-shaped flask equipped with a condenser, extracting the fatty acids therein with ethanol/toluene azeotropic mixture and measuring the amount thereof by gas chromatography, is 0.01 to 0.3 mass %.

4. A molding, comprising the sulfur-modified chloroprene rubber according to claim 1.

5. The molding according to claim 4, characterized by being a driving belt, a conveyer belt, an antivibration rubber or an air spring.

6. A method of producing a sulfur-modified chloroprene rubber having peak tops at 3.55 to 3.61 ppm and 3.41 to 3.47 ppm in $^1$H-NMR spectrum, as determined in deuterochloroform solvent, wherein the ratio (A/B) of the peak area (A) of 3.55 to 3.61 ppm to the peak area (B) of 4.2 to 6.5 ppm is 0.05/100 to 0.50/100 and having an extract with ethanol/toluene azeotropic mixture, as specified in JIS K 6229, of 3.0 to 9.0 mass %, the method comprising:

a polymerization step of obtaining a polymer by emulsion polymerization of a mixture of at least sulfur and chloroprene; and a plasticizing step of modifying the terminals of the polymer tetramethylthiuram disulfide with at least one compound selected from tetraalkylthiuram disulfides represented by Chemical Formula (3) below and dialkyldithiocarbamic acid salts represented by Chemical Formula (4) below:

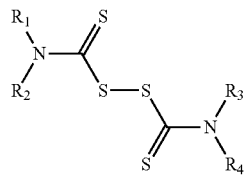

(3)

wherein, $R_1$, $R_2$, $R_3$ and $R_4$ each represent an alkyl group having a carbon number of 2 to 7,

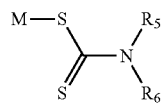

(4)

wherein, $R_5$ and $R_6$ each represent an alkyl group having a carbon number of 1 to 7 and M represents a metal element.

7. The sulfur-modified chloroprene rubber according to claim 2, wherein a fatty acid content of the rubber, as determined by placing the cut sulfur-modified chloroprene rubber in an eggplant-shaped flask equipped with a condenser, extracting the fatty acids therein with ethanol/toluene azeotropic mixture and measuring the amount thereof by gas chromatography, is 0.01 to 0.3 mass %.

8. A molding, comprising the sulfur-modified chloroprene rubber according to claim 2.

9. A molding, comprising the sulfur-modified chloroprene rubber according to claim 3.

* * * * *